Nov. 2, 1943.  W. A. V. THOMSEN  2,333,130
CONTROL DEVICE
Filed Sept. 20, 1941    2 Sheets-Sheet 1
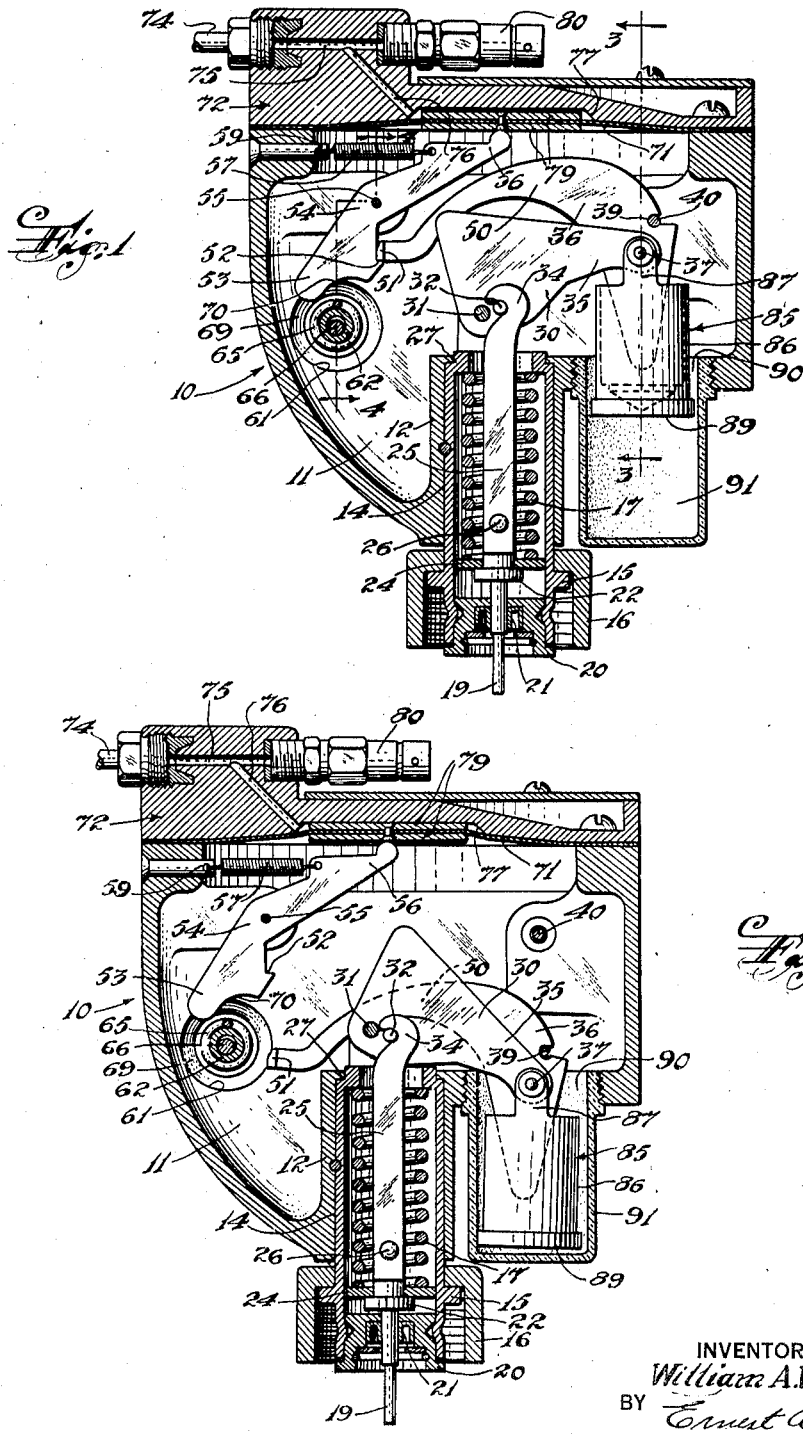
INVENTOR
William A. V. Thomsen
BY Ernest A. Joerren
ATTORNEY

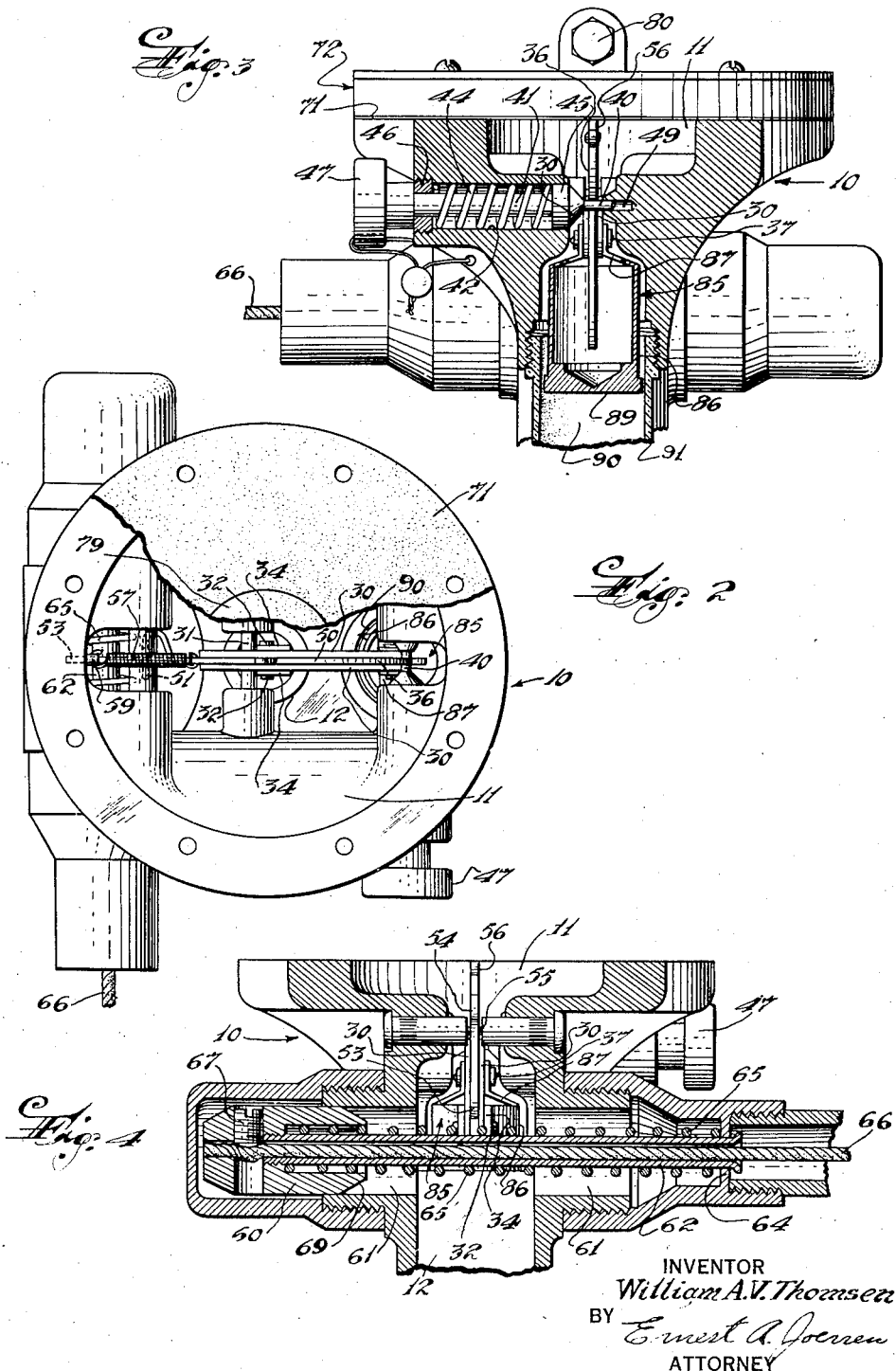

Patented Nov. 2, 1943

2,333,130

UNITED STATES PATENT OFFICE 2,333,130

CONTROL DEVICE

William A. V. Thomsen, Montclair, N. J., assignor to Specialties Development Corporation, Bloomfield, N. J., a corporation of New Jersey Application September 20, 1941, Serial No. 411,763

25 Claims. (Cl. 74—2)

The present invention relates to control devices, and more particularly to a control device adapted to be actuated by the application of a relatively slight force to operate the valves of systems for dispensing or discharging a medium stored under high pressure.

The present invention aims to provide a control device used in connection with systems for releasing a fluid pressure medium, such as carbon dioxide, which is adapted to extinguish fires, inflate flotation bags, life rafts or the like, or operate various pressure actuated mechanism. The device of the present invention is particularly adapted to control the operation of the valves of such systems.

An object of the present invention is to provide a control device adapted to be actuated by a relatively slight force.

Another object of the invention is to provide a control device adapted to be operated by air pressure supplied by an explosive force or by a pressure medium, or by mechanical actuating means.

Another object is to provide a control device adapted to be actuated locally or from a remote location.

Another object is to provide a control device which is positive and effective in operation, is constructed of a minimum number of parts, and can be economically manufactured and assembled.

Another object is to provide a control device which is sturdy in construction and requires a minimum amount of maintenance and repair.

Another object is to provide a control device of the spring stored energy type which is readily reset.

A further object is to provide a control device wherein the resetting and indication of operation are accomplished by a single means.

Other and further objects, not specifically enumerated above, will be apparent when described in greater detail in connection with the accompanying drawings, wherein:

Figure 1 is a sectional view of a control device, illustrating an embodiment of the present invention.

Figure 2 is a top view of the control device, with the cover removed and a portion broken away to illustrate the interior.

Figure 3 is a sectional view taken substantially along the line 3—3 on Figure 1.

Figure 4 is a sectional view taken substantially along the line 4—4 on Figure 1.

Figure 5 is a sectional view similar to Figure 1 showing the parts of the device after operation thereof.

Referring to the drawings, there is shown a control device comprising a casing or housing 10 having a bell or trumpet shaped chamber 11 therein for housing the operating parts of the device which will be described hereafter. The interior lower portion of the casing is provided with a tubular portion 12 in which is secured a substantially cylindrical tubular sleeve 14 having an outwardly extending flange 15 adjacent its lower end, adapted to carry a coupling nut 16 for attaching the device to a valve in a pressure medium dispensing or discharging system (not shown).

The sleeve 14 provides a chamber for a cylindrical helical spring 17 adapted to store energy which may be utilized to move a plunger 19 which in turn may control the opening of a valve. The plunger 19 is slidably supported by a housing member 20 secured in the lower portion of the sleeve and having a packing or sealing member 21 extending about the shank of the plunger. The upper portion of the plunger has an outwardly extending flange 22 for carrying a washer 24, and a pair of link members 25 telescoped through the spring 17 have their lower ends attached to the plunger at 26 by a rivet or the like. The spring 17 is adapted to be compressed by moving the link members 25 upwardly, whereby the washer 24 engages the lower end of the spring and causes the upper end of the spring to be forced against an inwardly extending flange 27 at the upper end of the sleeve 14. The link members are held in their upper position to load the spring by a latch and lever system about to be described.

The latch and lever system illustrated herein, may comprise a pair of levers 30 arranged side by side, each lever 30 being pivoted on a pin or rod 31 suitably journalled in the casing 10. A suitable pin or rivet 32 extends through the levers 30, adjacent the pin 31, and the respective free ends of the pin or rivet 32 are each adapted to pivotally support one of the spring compressing link members 25 (Figure 2). To facilitate assembly, the upper ends of the link members may be provided with a hook shaped portion 34 for engaging the pin 32.

The levers 30 each have an arm 35 between which a latching lever 36 is positioned. The lever 36 is pivotally connected adjacent the free end of each arm by a suitable pin or rivet 37. The latching lever 36 is provided with a notch or recess 39, adjacent the pivot pin 37, for receiving a pin 40 for holding the levers 30 and 36 in latched position. The pin 40 may be slidably mounted in the casing 10 (Figure 3) by securing one end thereof to a plunger 41 slidably mounted in a bore 42 in the casing. The plunger 41 is adapted to be urged inwardly by a spring 44 coiled about the plunger. The spring 44 has one end engaging a head 45 on the plunger and has its other end engaging a retaining disc 46 threaded into the bore 42. The outer end of the plunger carries a manually engageable knob or gripping member 47 for retracting the plunger in opposition to the spring 44 to move the pin 40 out of latching position. When the pin 40 is in latching position, its free end may extend into a bore or aperture 49 in the casing which provides additional support for the pin and serves to maintain the pin in alignment.

The lever 36 is provided with a relatively long arm 50 adapted to be tripped by a slight force to permit the lever 36 to pivot and cause the notch or recess 39 to move away from the pin 40. Preferably, the free end of the arm 50 has a lug or ear 51 (Figure 1) for engaging a notch 52 provided in the arm 53 of a trigger lever 54 which is pivotally mounted on a rod 55 (Figure 4) supported in the casing 10. The lever 54 has an arm 56 to which one end of a spring 57, or the like, is attached, and the other end of the spring is suitably connected to the casing at 59. The spring 57 is slightly tensioned to maintain the arm 56 in a position so that the notch 52 of the trigger lever engages the lug or ear 51 on the arm of the latching lever. When the arm 56 is moved in opposition to the spring 57 the latching lever 36 is released.

The trigger lever 54 may be oscillated to release the latch lever 36 by means of a pull cable actuated device (Figure 4). Such a device may comprise a cam member 60 slidably mounted in a bore 61 in the casing 10; a sleeve 62 secured to the cam and extending through a guide 64; and a spring 65 coiled about the sleeve 62, the spring having one end engaging the guide 64 and having the other end engaging the cam member. A pull cable or other flexible member 66 extends through the sleeve 62, and is secured to the cam member 60 by a set screw 67. The cam member is provided by a frusto-conical cam portion 69 positioned to engage an arcuate portion 70 of the trigger lever arm 53 when the cable is pulled to move the cam member 60 towards the lever 54 in opposition to the spring 65.

The trigger lever 54 may also be moved to release the latch lever 36 by the operation of a pneumatic device (Figure 1). Such a device may comprise a diaphragm 71 positioned at the top of the casing 10 and held in position by a cover 72 for the casing. A conduit 74 is attached to the cover for introducing a blast of air or other suitable pressure medium which is conducted by apertures 75 and 76 to a recess 77 in the cover above the diaphragm, and is adapted to move the diaphragm downwardly to engage and move the arm 56 of the lever 54 to release the latch lever 36. If desired, the central portion of the diaphragm may be provided with a pair of reinforcing discs 79 suitably secured thereto. In order to vent pressure in the recess 77, a relief or bleed device 80 is in communication with the aperture 75 for introducing pressure.

One of the features of the control device of the present invention is to provide a single means for indicating when the device has been operated and for resetting the device. The foregoing may be accomplished by pivotally suspending an indicating and resetting member 85 from the pin or rivet 37 connecting the levers 30 and 36 (Figures 1, 3 and 5). The member 85 preferably comprises a substantially cylindrical body portion 86 having a conspicuous color; a pair of ears 87 at the upper end of the body portion for receiving the pin or rivet 37; and a substantially circular bottom portion 89 providing a thumb rest or manually engageable portion for resetting the device.

When the device is operated by retracting the pin 40 or releasing the trigger and latch levers by means of the cam 60 or the diaphragm 71, the member 85 is moved downwardly through an aperture 90 in the casing 10, and is clearly visible to indicate that the device has been operated (Figure 5). In order to reset the device the bottom portion 89 is engaged manually and is pushed upwardly into the aperture 90. This causes the arm 35 of the levers 30 and the lever 36 to be carried upwardly in opposition to the spring 17, and enables the pin 40 to reengage the notch 39 of the latch lever 36. As this occurs, the lug 51 on the arm 50 of the lever 36 reengages the notch 52 of the trigger lever 54, whereby the levers are reset.

The bottom 89 of the resetting and indicating member may be knurled or corrugated to facilitate manual engagement and may be sufficiently large to provide a good grip. The resetting and indicating member may be protected by a cup shaped cap or guard member 91, formed of transparent material through which the member 85 is readily visible when in its lower position. The guard member, preferably, is threaded into the aperture 90, and may be readily unscrewed to attain access to the member 85 when it is desired to reset the device.

From the foregoing description it will be seen that the present invention provides a control device which is readily actuated by locally or remotely controlled means. The device is provided with means which serve to indicate when the device has been actuated and, at the same time, may be utilized to reset the device. The resetting means are readily operable, and a minimum amount of manual effort is required to reset the operating spring, and the latch and lever system. The parts of the device are rugged in construction, and can readily withstand any rough usage to which they may be subjected.

While my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

I claim:

1. In a device of the class described, the combination of a spring, spring compressing means including a member for operating said means, a latching member operatively connected to said first member, latching means for maintaining said latching member in a position whereby said first member is adapted to maintain said means in a spring compressing position, means for rendering said latching means ineffective, and a manually engageable member carried by said members for moving said latching member into latched position.

2. In a device of the class described, the combination of a spring, spring compressing means including a lever for operating said means, a latching lever carried by said first lever, means for latching said latching lever in a position whereby said first lever maintains said first means in a spring compressing position, means for rendering said latching means ineffective, and a manually engageable member carried by said levers for moving said latching lever into latched position.

3. In a device of the class described, the combination of a spring, spring compressing means including a pivotally mounted lever for operating said means, a latching lever, a pivot for pivotally connecting said levers, means for latching said latching lever in a position whereby said first lever maintains said first means in a spring compressing position, means for rendering said latching means ineffective, and a manually engageable member pivotally suspended from said pivot for moving said latching lever into latched position.

4. In a device of the class described, the combination of a spring, spring compressing means including a member for operating said means, a latching member operatively connected to said first member, latching means for maintaining said latching member in a position whereby said first member is adapted to maintain said first means in a spring compressing position, means for rendering said latching means ineffective, and a manually engageable member carried by said members for moving said latching member into latched position, said last member serving to indicate when said latching member is in an unlatched position.

5. In a device of the class described, the combination of a spring, spring compressing means including a pivotally mounted lever for operating said means, a latching lever, a pivot for pivotally connecting said levers, means for latching said latching lever in a position whereby said first lever maintains said first means in a spring compressing position, means for rendering said latching means ineffective, a manually engageable member pivotally suspended from said pivot for moving said latching lever into latched position, and a casing for said foregoing elements, said casing having an aperture through which said manually engageable member is adapted to project when said latching lever is unlatched, whereby said member provides a visible indication that said latching lever is unlatched.

6. In a device of the class described, the combination of a spring, spring compressing means including a lever for operating said means, a latching lever pivotally connected to said first lever, means for engaging said latching lever for latching said latching lever whereby said first lever maintains said first means in a spring compressing position, a manually engageable member operatively connected to said latching lever for moving said latching lever into latched position, and a tripping lever for engaging and unlatching said latching lever.

7. In a device of the class described, the combination of a spring, spring compressing means including a lever for operating said means, a latching lever pivotally connected to said first lever and having a groove therein, pin means for engaging the groove in said latching lever for latching said latching lever whereby said first lever maintains said first means in a spring compressing position, a manually engageable member operatively connected to said latching lever for moving said latching lever into latched position, and means for effecting disengagement of said pin and groove to unlatch said latching lever.

8. In a device of the class described, the combination of a spring, spring compressing means including a lever for operating said means, a latching lever pivotally connected to said first lever, means for engaging said latching lever for latching said latching lever whereby said first lever maintains said first means in a spring compressing position, a manually engageable member operatively connected to said latching lever for moving said latching lever into latched position, a tripping lever for engaging and unlatching said latching lever, and means for moving said tripping lever to cause said tripping lever to unlatch said latching lever.

9. In a device of the class described, the combination of a spring, spring compressing means including a lever for operating said means, a latching lever pivotally connected to said first lever, means for engaging said latching lever for latching said latching lever whereby said first lever maintains said first means in a spring compressing position, a manually engageable member operatively connected to said latching lever for moving said latching lever into latched position, a tripping lever for engaging and unlatching said latching lever, and cam means for moving said tripping lever to cause said tripping lever to unlatch said latching lever.

10. In a device of the class described, the combination of a spring, spring compressing means including a lever for operating said means, a latching lever pivotally connected to said first lever, means for engaging said latching lever for latching said latching lever whereby said first lever maintains said first means in a spring compressing position, a manually engageable member operatively connected to said latching lever for moving said latching lever into latched position, a tripping lever for engaging and unlatching said latching lever, and pressure actuated means for moving said tripping lever to cause said tripping lever to unlatch said latching lever.

11. In a device of the class described, the combination of a spring; spring compressing means including a lever for operating said means; a latching lever operatively connected to said first lever and having a groove therein; pin means for engaging the groove in said latching lever for latching said latching lever in a position whereby said first lever maintains said first means in a spring compressing position; a manually engageable member operatively connected to said latching lever for moving said latching lever into latched position; a tripping lever for engaging and unlatching said latching lever; and means for moving said pin means out of engagement with the groove in said latching lever to effect unlatching of said latching lever.

12. In a device of the class described, the combination of a spring; spring compressing means including a lever for operating said means; a latching lever operatively connected to said first lever; means for engaging said latching lever for latching said latching lever in a position whereby said first lever maintains said first means in a spring compressing position; a manually engageable member operatively connected to said latching lever for moving said latching lever into latched position; a tripping lever for engaging and unlatching said latching lever; means for moving said tripping lever to cause said tripping lever to unlatch said latching lever; and a casing for said foregoing elements, said casing having an aperture through which said manually engageable member is adapted to project when said latching lever is unlatched and thereby provide a visible indication that said latching lever is unlatched.

13. In a device of the class described, the combination of a spring; spring compressing means including a pivotally mounted lever for operating said means; a latching lever; a pivot for pivotally connecting said levers; means for latching said latching lever to maintain said first lever and said first means in a spring compressing position; a pivotally mounted tripping lever for engaging and unlatching said latching lever; resilient means for maintaining said tripping lever in engagement with said latching lever; a manually engageable member pivotally suspended from said pivot for moving said latching lever into latched position; and a casing for said foregoing elements, said casing having an aperture through which said last member is adapted to project when said latching lever is unlatched whereby said last member provides a visible indication that said latching lever is unlatched.

14. In a device of the class described, the combination of a spring; spring compressing means including a pivotally mounted lever for operating said means; a latching lever; a pivot for pivotally connecting said levers; means for latching said latching lever to maintain said first lever and said first means in a spring compressing position; a pivotally mounted tripping lever for engaging and unlatching said latching lever; resilient means for maintaining said tripping lever in engagement with said latching lever; a cam for engaging said tripping lever and moving it to cause said latching lever to be unlatched; a manually engageable member pivotally suspended from said pivot for moving said latching lever into latched position; and a casing for said foregoing elements, said casing having an aperture through which said last member is adapted to project when said latching lever is unlatched whereby said last member provides a visible indication that said latching lever is unlatched.

15. In a device of the class described, the combination of a spring, spring compressing means including a pivotally mounted lever for operating said lever; a latching lever; a pivot for pivotally connecting said levers; means for latching said latching lever to maintain said first lever and means in a spring compressing position; a pivotally mounted tripping lever for engaging and unlatching said latching lever; resilient means for maintaining said tripping lever in engagement with said latching lever; a pressure actuated diaphragm for engaging said tripping lever and moving it to cause said latching lever to be unlatched; a manually engageable member pivotally suspended from said pivot for moving said latching lever into latched position; and a casing for said foregoing elements, said casing having an aperture through which said last member is adapted to project when said latching lever is unlatched whereby said last member provides a visible indication that said latching lever is unlatched.

16. In a device of the class described, the combination of a spring; compressing means including a lever for operating said means; a latching lever operatively connected to said first lever and having a groove therein; pin means adapted to extend into the groove in said latching lever for latching said latching lever in a position whereby said first lever maintains said first means in a spring compressing position; a manually engageable member operatively connected to said latching lever for moving said latching lever into latched position; and means for moving said pin means out of engagement with said latching lever to effect unlatching of said latching lever.

17. In a device of the class described, the combination of a spring; spring compressing means including a pivotally mounted lever for operating said means; a latching lever having a groove therein; a pivot for pivotally connecting said levers; pin means adapted to extend into the groove in said latching lever for latching said latching lever in a position, whereby said first lever maintains said first means in a spring compressing position; a manually engageable member pivotally suspended from said pivot for moving said latching lever into latched position; and means for moving said pin means out of engagement with said latching lever to effect unlatching of said latching lever.

18. In a device of the class described, the combination of a spring; spring compressing means including a lever for operating said means; a latching lever operatively connected to said first lever; means for engaging said latching lever for latching said latching lever in a position whereby said first lever maintains said first means in a spring compressing position; a manually engageable member operatively connected to said latching member for moving said latching lever into latching position; a tripping lever for engaging and unlatching said latching lever; a cam for engaging said tripping lever and moving it to cause said latching lever to be unlatched; and a casing for said foregoing elements, said casing having an aperture through which said manually engageable member is adapted to project when said latching lever is unlatched and thereby providing a visible indication that said latching lever is unlatched.

19. In a device of the class described, the combination of a spring; spring compressing means including a lever for operating said means; a latching lever operatively connected to said first lever; means for engaging said latching lever for latching said latching lever in a position whereby said first lever maintains said first means in a spring compressing position; a manually engageable member operatively connected to said latching member for moving said latching lever into latched position; a tripping lever for engaging and unlatching said latching lever; a pressure actuated diaphragm for engaging said tripping lever and moving it to cause said latching lever to be unlatched; and a casing for said foregoing elements, said casing having an aperture through which said manually engageable member is adapted to project when said latching lever is unlatched and thereby providing a visible indication that said latching lever is unlatched.

20. In a device of the class described, the combination of a spring; spring compressing means including a pivotally mounted lever for operating said means; a latching lever; a pivot for pivotally connecting said lever; means for latching said latching lever to maintain said first lever and said first means in a spring compressing position; means including a tripping lever for effecting unlatching of said latching lever; a manually engageable member pivotally supported from said pivot for moving said latching lever into latched position and a casing for said foregoing elements, said casing having an aperture through which said last member is adapted to project when said latching member is unlatched whereby said last member provides a visible indication that said latching lever is unlatched.

21. In a device of the class described, the combination of a spring; spring compressing means including a pivotally mounted lever for operating said means; a latching lever; a pivot for pivotally connecting said levers; means for latching said latching lever to maintain said first lever and said first means in spring compressing position; a pivotally mounted tripping lever for engaging and unlatching said latching lever; resilient means for maintaining said tripping lever in engagement with said latching lever; means for moving said tripping lever to cause said tripping lever to unlatch said latching lever; a manually engageable member pivotally suspended from said pivot for moving said latching lever into latched position; and a casing for said foregoing elements, said casing having an aperture through which said last member is adapted to project when said latching lever is unlatched, whereby said last member provides a visible indication that said latching lever is unlatched.

22. In a device of the class described, the combination of a spring; spring compressing means including a member for operating said means; a latching member operatively connected to said first member; latching means for maintaining said latching member in a position whereby said first member is adapted to maintain said first means in a spring compressing position; means for rendering said latching means ineffective; a manually engageable member operatively connected to said members for moving said latching member into latched position; and a casing for said foregoing elements, said casing having an aperture through which said manually engageable member is adapted to project when said latching member is unlatched, whereby said manually engageable member provides a visible indication that said latching member is unlatched.

23. In a device of the class described, the combination of a spring; spring compressing means including a member for operating said means; a latching member operatively connected to said first member; latching means for maintaining said latching member in a position whereby said first member is adapted to maintain said first means in a spring compressing position; means for rendering said latching means ineffective; a manually engageable member operatively connected to said members for moving said latching member into latched position; a casing for said foregoing elements, said casing having an aperture through which said manually engageable member is adapted to project when said latching member is unlatched, whereby said manually engageable member provides a visible indication that said latching member is unlatched; and a guard member on said casing for shielding and permitting observation of said manually engageable member when it projects through the aperture of said casing.

24. In a device of the class described, the combination of a spring; spring compressing means including a member for moving said means, a latching member operatively associated with said means, latching means for maintaining said latching member in a position whereby said first means is maintained in a spring compressing position, means for rendering said latching means ineffective, and a manually engageable member operatively connected for operating said first member to move said first means into spring compressing position and said latching member into latching position.

25. In a device of the class described, the combination of a spring, spring compressing means including a lever for operating said means, a latching lever carried by said first lever, means for latching said latching lever in a position whereby first lever maintains said first means in a spring compressing position, means for rendering said latching means ineffective, and a manually engageable member carried by said levers for moving said latching lever into latched position, said manually engageable member serving to indicate when said latching lever is in an unlatched position.

WILLIAM A. V. THOMSEN.